United States Patent

Kosonen et al.

[11] Patent Number: 5,791,856
[45] Date of Patent: Aug. 11, 1998

[54] METHOD AND ASSEMBLY FOR TRANSFERRING SPACE MODULES

[75] Inventors: Jorma Kosonen, Tammela; Matti Heinonen, Forssa, both of Finland

[73] Assignee: Parma Oy, Forssa, Finland

[21] Appl. No.: 737,246

[22] PCT Filed: May 9, 1995

[86] PCT No.: PCT/FI95/00243

§ 371 Date: Jan. 14, 1997

§ 102(e) Date: Jan. 14, 1997

[87] PCT Pub. No.: WO95/31387

PCT Pub. Date: Nov. 23, 1995

[30] Foreign Application Priority Data

May 17, 1994 [FI] Finland .................. 942298

[51] Int. Cl.⁶ .......................... B65D 90/18; B65G 7/00
[52] U.S. Cl. .......................... 414/458; 414/786
[58] Field of Search .................. 414/458, 786; 280/35

[56] References Cited

U.S. PATENT DOCUMENTS

| | | | |
|---|---|---|---|
| 1,520,630 | 12/1924 | Bateman | 414/458 |
| 2,359,016 | 9/1944 | Wood | 414/458 X |
| 2,450,690 | 10/1948 | Robins | 414/458 |
| 2,551,097 | 5/1951 | Cole | 414/458 |
| 3,010,591 | 11/1961 | Bard | 414/458 |
| 3,193,301 | 7/1965 | Talbert et al. | 414/455 X |
| 3,243,193 | 3/1966 | Fulmer et al. | 414/458 X |
| 3,570,694 | 3/1971 | Tanttinger | 414/458 |
| 3,631,999 | 1/1972 | Walerowski | 414/458 |
| 3,672,634 | 6/1972 | Chaffin | 414/458 X |
| 4,231,709 | 11/1980 | Corsetti | 414/458 |
| 4,452,555 | 6/1989 | Calabro | 414/458 X |
| 4,611,816 | 9/1986 | Traisten et al. | 414/458 X |

FOREIGN PATENT DOCUMENTS 2369202  6/1978  France .................. 414/458

*Primary Examiner*—David A. Bucci
*Attorney, Agent, or Firm*—Smith-Hill and Bedell

[57] ABSTRACT

A prefabricated space module resting on a horizontal support surface is transferred using at least three elongate stands, each stand having a wheel at a first end and an engagement element at a second end. The engagement elements are adapted to engage respective attachment elements of the space module. Each stand is of a length such that a surface region of the wheel at the first end of the stand can engage the horizontal support surface when the stand is inclined to vertical and the engagement element at the second end of the stand is engaged with an attachment element of the space module. By displacing the first end of each stand toward a position in which the stand is more nearly vertical while the engagement elements remain engaged with the respective attachment elements, the space module is elevated clear of the horizontal support surface.

10 Claims, 1 Drawing Sheet

5,791,856

1

METHOD AND ASSEMBLY FOR TRANSFERRING SPACE MODULES

BACKGROUND OF THE INVENTION

The present invention relates to a method for transferring prefabricated ship cabin modules and similar components in ships, offshore structures and buildings erected on land.

The invention also concerns an assembly for transferring a space module.

Increasingly it is desired that structures of ships, offshore drilling platforms and similar constructions be first assembled into prefabricated components which are then mounted in place to the ship's base structure on-site at the shipyard. This approach offers an essential time reduction in the erection schedule and cost cutting, because a major part of the structures can be prefabricated industrially on efficient manufacturing lines. Particularly cabin structures are typically pre-fabricated into fully furnished modules which are transferred as complete modules into the ship. Then, the decoration and furnishing works of the cabin module can be completed in the indoor premises of assembly halls thus avoiding awkward detail furnishing in the ship itself. However, prefabricated cabin modules are relatively large and their transfer requires different kinds of accessories to aid their final positioning. Such transfer operations are complicated by the fact that a semifinished ship does not necessarily have enough room to permit the use of hoists, fork trucks and other transfer equipment.

U.S. Pat. No. 3,363,597 discloses a method of assembling the ship's interior spaces from prefabricated space modules. According to this method, the interior spaces are assembled from space modules equipped with support flanges, whereby such modules are designed to include several space units in one module. The interior space modules are mounted in a matrix-like beam lattice in several tiers by inserting the modules in the openings of the lattice and then fixing the modules to each other. The transfer of such modules is extremely clumsy as they are not compatible with any conventional transfer equipment.

Patent publication SE 377,681 discloses a container ship in which the container hold may be temporarily converted into a passenger space comprised of cabin and/or similar containerized modules. The containers are connected by temporary arrangements to the ship's HPAC and electrical systems. The assembly of the passenger cabin section takes place using cabin, shower, stairway and bathroom modules with dimensions compatible with the ISO standard containers. Most of these units are adapted to have an accessway extending laterally through the unit. Units of the same tier are placed in rows so that the accessways form corridor sections, which can be joined from the opposite sides of the same stairway module to provide an access between two superimposed tiers. According to the disclosed arrangement, identical modules in the superimposed tiers are suggested to be superimposed above one another between two decks of the ship. Hatchways with covers are provided between the uppermost stairway module and the upper deck. Permanently installed HPAC and electrical supply systems are placed on the lowermost deck. The containerized modules are transferred by means of conventional container handling equipment. Such a system is suited to special applications and temporary service only, and is not intended for use in conventional shipbuilding.

FI Pat. No. 62,984 describes a system which is based on the use of prefabricated, floorless cabin modules. Except for their lacking floor, such modules are ready-for-use space

2 modules which form a finished, easy-to-mount cabin requiring no major finishing and decoration after its installation in place. The transfer of the floorless cabin module to its installation site occurs by first mounting detachable wheels to the corners of the module and then pushing the module from the inside. In this manner the modules can be easily transferred even to tight places. The transfer elements which are temporarily connected to the cabin modules are economical in use, and, e.g., with respect to a permanent transport carriage, such temporary transfer equipment offers significant cost savings as the temporary transfer elements can recovered for reuse. The wheels to be temporarily adapted or mounted to the corners of the cabin module should preferentially extend horizontally only marginally outside the cabin module. Each transport unit is provided with a detachable transfer element and a frame to which the cabin module is supported during the transfer operation. The transfer element, e.g., a wheel is supported to the frame of the transport unit at the underside of its bottom corners and edges.

By arranging the transport units basically to the inside of the cabin module, the module is easy to support laterally to the frame of the transport unit. Then, the transfer elements can be replaced from inside the cabin unit. A shortcoming of this transfer system is that lifting the cabin module onto the wheels still requires the use of a separate lift means, which complicates the handling of the cabin module. Wheels of the above-described type are suitable for the transfer of floorless cabin modules only, which curtails the applications of this arrangement. Moreover, the cabin module must be rather rigid, because its weight is imposed directly from above onto the fixing elements of the wheels which are attached to the lower edges of the walls and said fixing elements are relatively poorly suited to provide support to the cabin module. Hence, the cabin module lower edge must be reinforced to make the module edge capable of taking the stresses at the fixing points of the transfer elements. The mounting of the space module is further impeded and complicated by the fact that the space module must be opened and a mechanic has to enter the module in order to mount the transfer elements in place and to push the module. As it is difficult to guide the module in place by operating from its inside, several craftsmen are required to handle the module.

Prior to their transfer and mounting in place, such modular cabins are outfitted with required furniture and other equipment. This arrangement avoids, e.g., the moving of furniture through the narrow accessways of the ship. In fact, furniture and other equipment possess an inherent rigidity in themselves. This property is utilized by mounting the fixed furniture and other permanent appliances to the walls of the cabin module so as to increase thereby the rigidity of cabin modules.

FI Pat. No. 62,984 further mentions that cabin modules can be moved and mounted in place supported by an air cushion. To form and maintain such an air cushion, the cabin modules are provided at their open bottom with a tight, pouch-like apron unit suited for filling by air feed and having an exit opening. The pouch-like element which thus supports the cabin module is made from a plastic film, for instance. However, such a method is rather expensive and the large fan required to keep the module floating causes severe noise abatement problems in the closed spaces of a ship.

SUMMARY OF THE INVENTION

It is an object of the present invention to provide a method in which different kinds of space modules can be transferred in an easy and simple manner without the use of auxiliary lifting equipment.

The object of the invention is accomplished by providing the transferrable space module with at least three scaffold-stands with wheels, whereby said stands are attached at their distal ends with respect to the wheels to the outside of the module so that the distance between the attachment point and the lower edge of the module is smaller than the maximum length of the stand from the attachment point to the extreme lower point of the wheel, and then the module is elevated with the help of the stands to the transfer position.

The invention offers significant benefits.

The most important advantage of the invention is that the assembly itself can function as the lifting means thus disposing with the need for any separate lifting equipment. The lifting operation is performed from outside the space module, whereby the module need not be opened for lifting. According to the most advantageous embodiment of the invention, the lifting members are attached to the upper edge of the module roof, whereby the module weight is distributed evenly between the roof structures and the module is prevented from swaying under stresses imposed by its own weight during the transfer operation. Hence, the present invention makes it possible to transfer even the most elastic modules, because the module is supported by the lifting members during its transfer. Another embodiment of the invention includes a lattice fixed above the module so as to further support the module. The lifting and transfer of the module require no large high-power or special equipment. As the module is advantageously lifted at fixed lifting points attached to the module, the same lifting points may also be used for other transport operations of the module. The method according to the invention makes it possible to handle all kinds of space modules no matter if they have a floor or not. Typical objects to be handled are the cabin modules of ships and drilling platforms, room modules of hotels and floating hotels, various machinery spaces including spaces for lift machinery and similar equipment and other prefabricated spaces.

As the space modules are relatively light weighing typically approx. 2000–3000 kg, in a four-stand system the load imposed on each stand is accordingly rather low permitting a lightweight construction of the stand. Hence, a single mechanic can alone handle the stands and prepare the module for the transfer operation.

BRIEF DESCRIPTION OF THE DRAWINGS

The invention is next examined in greater detail with reference to attached drawings, in which.

DETAILED DESCRIPTION

Figure 1:
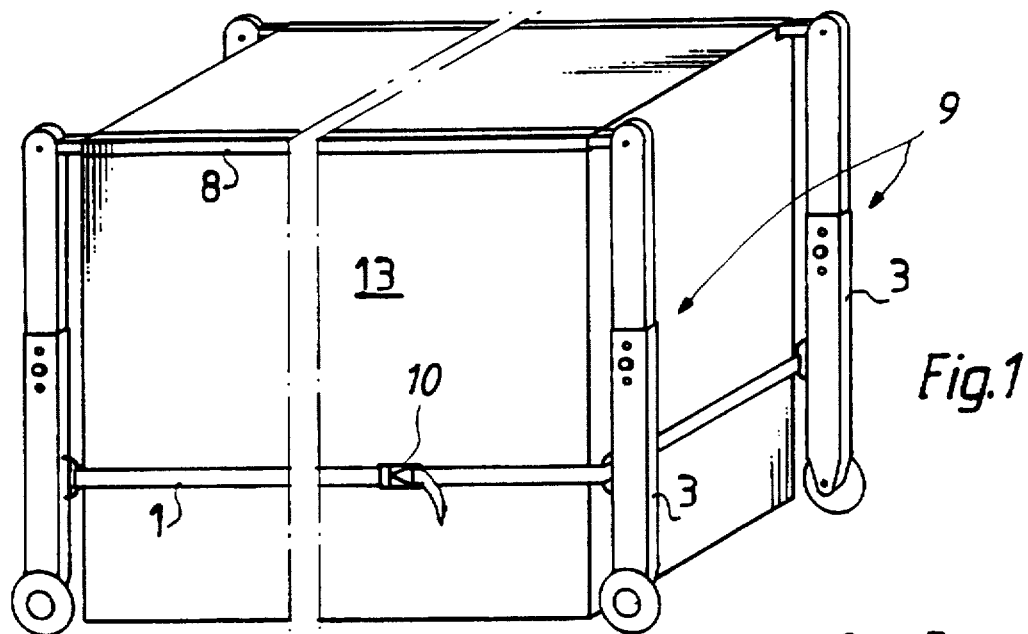
FIG. 1 illustrates a space module with the transfer members according to the invention attached thereto.
Figure 3:
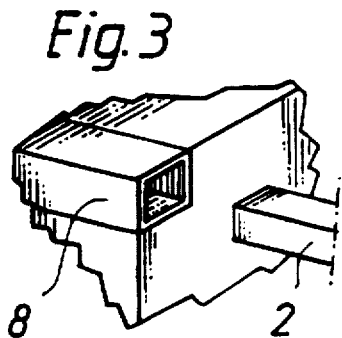
FIG. 3 illustrates an embodiment of the connection between the space module and the transfer members.
Figure 2:
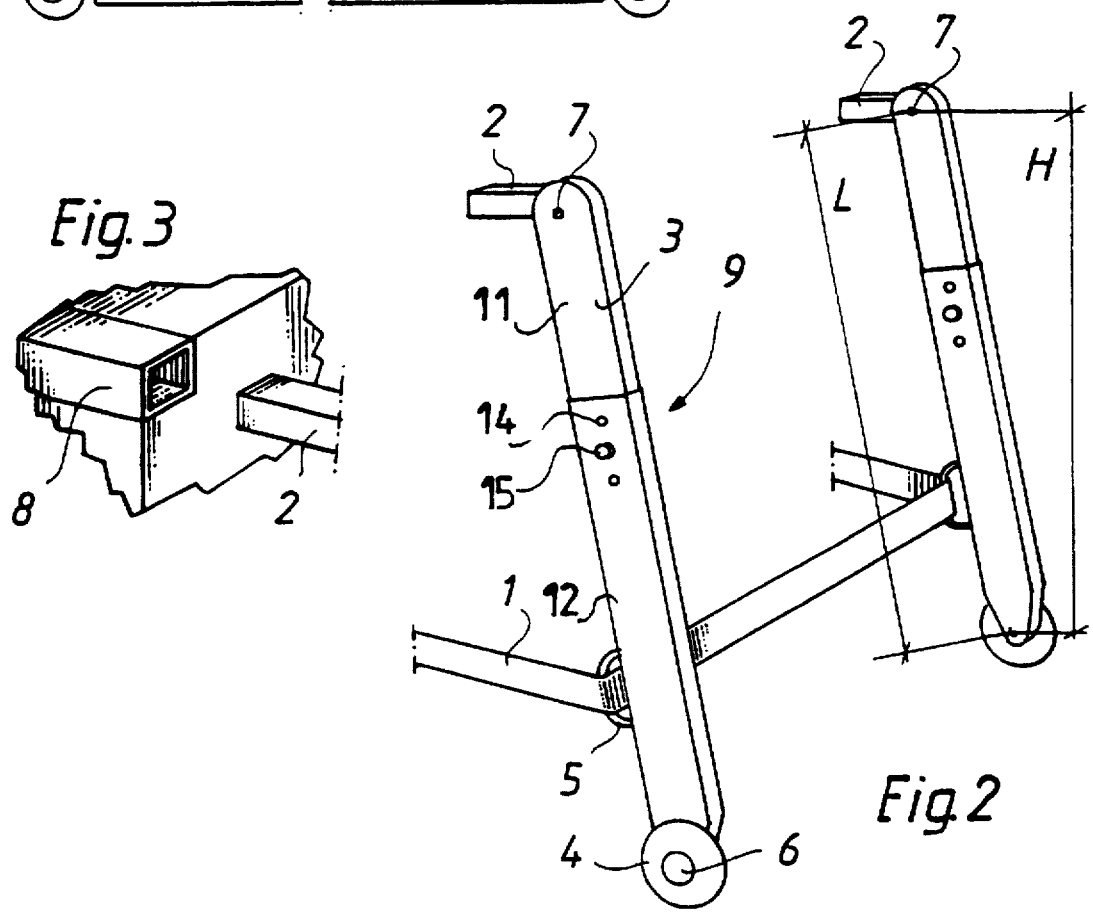
FIG. 2 illustrates a detail of the diagram of FIG. 1.

Now referring to the drawings, the transfer of a single space module requires four transfer members or stands 3. Each stand 3 comprises two telescoping tubular elements 11, 12, a stand length adjusting mechanism 9, a wheel mounted on a shaft 6 at the lower end of the stand and a fixing stub 2 of hollow square section mounted to the upper end of the stand by means of a shaft 7 as well as an eyelet 5 for a tightening strap. Each upper corner of the space module 13 to be transferred is provided with a hollow square section 8 into which the fixing stub 2 is adapted to fit. In the embodiment illustrated in FIG. 1, the hollow square section 8 is extended over the entire length of the long sides of the space module 13, whereby the sections 8 provide additional support to the roof of the module 13. When prepared ready for the transfer setup, the module 13 is surrounded by a tightening strap 1 adapted to pass via the eyelets 5. The length adjustment of the stands is implemented in the exemplifying embodiment illustrated in the drawings so that the telescoping tubular elements 11 and 12 of the stand are provided with a series of drilled holes 14 into which a locking pin 15 can be inserted. Thus, the length of the stands is readily adjustable by moving the position of the locking pin 15 in the holes.

According to the invention, the space module 13 is transferred as follows. During its prefabrication stage, two sides of the module are provided with a hollow square section 8 extending over the entire length of the side. The open ends of these hollow sections 8 form the attachment points for the transfer stands 3. The connection of the stands 3 to the module takes place by inserting the square fixing stub 2 into the end of the square hollow section 8. The length of the stands is adjusted such that the length L of the stand from the shaft 7 of the fixing stub to the shaft of the wheel is at least as large as the distance H of the hollow square section 8 from the lower end of the module 13. With this height adjustment, the module is elevated by the radius of the wheels 4 of the stands 3 from the ground level. When required, the stand can be set for a larger length, whereby more space remains between the bottom of the module and the transport route.

After the stands 3 are fixed to the upper corners of the module, the tightening strap 1 is passed about the module 13 via the eyelets 5. At this stage, the stands 3 are still inclined with respect to the walls of the modules 13 at an angle determined by their set length. When the tightening strap 1 is tightened with the help of a tightening device 10, the stands 3 are pivotally rotated about the shaft 7 and thus moved closer to the walls of the space module 13. Simultaneously, the module is elevated from the ground level, and as the module is elevated sufficiently high from the ground, it can be moved by pushing to the desired place. The stands can be left either in a slightly tilted position or tightened upright against the walls of the module as shown in FIG. 1. Obviously, the loading of the stands remains lower in the upright position.

Besides those elucidated in the foregoing, the invention may have alternative embodiments.

The length adjustment of the stands can be implemented in a plurality of different manners, for example, by jack screws. Stand constructions based on the upper pivotal joint and a simple, stepwise adjustable arrangement of stand length are essentially less complicated to implement and less costly to manufacture. In fact, the stand length adjustment is not absolutely necessary at all if the modules to be transferred have a standard height, or alternatively, if a selection of stands of different lengths are used. The connection between the space module and the stands may also be implemented in any desired manner. According to an interesting embodiment the module is grabbed by means of a lattice placed atop the roof of the module. The connection between the lattice and the module may be, e.g., similar to that used to transfer cargo containers, whereby the module may be easily moved by means of container handling equipment. Obviously, the stands may be fixed permanently to the roof grabbing lattice, while a detachable connection is preferred due to the easier handling and transport of the separate members detached from each other. The roof grabbing lattice is advantageously made adjustable by its size. All connections can be assured by locking pins, for instance.

When desired, the module can be transferred using three stands only, whereby one of the stands is located at the center of a wall. The wheels of the stands are advantageously standard industrial wheels or rollers. The tightening means can adeptly be a conventional cargo securing strap with a tightening mechanism, while other types of tightening devices offering easy tightening may also be used. If jack-type stands are employed, they can be fixed to the walls of the space module with the help of locking pins or similar locking means whereby the tightening strap is obviated. However, as the encompassing strap provides additional stiffening of the structure, its use is recommendable. Furthermore, the scope and spirit of the invention entails such a transfer system in which the stands are connected to lower points of the module walls or corners than to the upper edge of the module roof, whereby such an arrangement subjects the module walls unnecessary stresses during lifting and transfer. The pivotal joint of the stand about which the stand is pivoted during the lifting operation may be located lower in the stand than at its upper attachment point. Accordingly, the pivotal point may even be close to the center of the stand, but this arrangement necessitates assuring the stability of the stand by suitable locking means.

We claim:

1. A method for transferring a prefabricated space module having a lower edge resting on a horizontal support surface and also having an exterior surface and at least three attachment elements exposed at the exterior surface and spaced vertically from the lower edge, said method including:
   (a) providing at least three stands, each stand having first and second opposite ends with a wheel at its first end and a pivoting engagement element at its second end, and wherein the respective engagement elements of the stands are adapted to engage the attachment elements respectively and each stand is of a length such that a surface region of the wheel at the first end of the stand can engage the horizontal support surface when the stand is inclined to vertical and the engagement element at the second end of the stand is engaged with an attachment element of the space module,
   (b) engaging the wheels of the stands with the horizontal support surface and engaging the engagement elements of the stands with the attachment elements respectively, and
   (c) displacing the first end of each stand toward a position in which the stand is more nearly vertical while the engagement elements remain engaged with the respective attachment elements, whereby the lower edge of the space module is elevated clear of the horizontal support surface.

2. A method according to claim 1, wherein the space module has upper corners and the attachment elements are exposed at the upper corners of the space module.

3. A method according to claim 1, wherein the attachment elements are sockets and the engagement elements are plugs adapted to fit in the sockets, and step (b) comprises engaging the plugs with the sockets by horizontal relative movement.

4. A method according to claim 1, wherein each stand comprises an arm and the engagement element is pivotally attached to the arm, and wherein step (c) comprises pivoting the arm relative to the engagement element.

5. A method according to claim 1, wherein step (c) comprises providing a strap extending around the space module and operatively engaged with the stands, and tightening the strap so as to force each stand to a substantially vertical orientation and simultaneously secure the stands to the space module.

6. A method according to claim 1, wherein the prefabricated space module is substantially rectangular in plan and has four upper corners at which respective attachment elements are exposed at the exterior surface of the module, step (a) comprises providing four stands and step (b) comprises engaging the engagement elements of the four stands with the four attachment elements respectively.

7. An assembly for transferring a space module having a lower edge resting on a horizontal support surface and also having an exterior surface and at least three attachment elements exposed at the exterior surface and spaced vertically from the lower edge, said assembly including:
   at least three stands, each stand comprising an elongate arm with first and second opposite ends, a wheel attached to the arm at its first end and an engagement element pivotally attached to the arm at its second end, and wherein the respective engagement elements of the stands are adapted to engage the attachment elements respectively, and each arm is of a length such that a surface region of the wheel at the first end of the arm can engage the horizontal support surface when the stand is inclined to vertical and the engagement element at the second end of the arm is engaged with an attachment element of the space module, and
   a displacement means coupled to the stands for displacing the first end of each arm from an inclined position toward said space module to a position in which the arm is more nearly vertical, by pivoting the arm relative to the engagement element, while the engagement elements remain engaged with the respective attachment elements, whereby the lower edge of the space module is elevated clear of the horizontal support surface.

8. An assembly according to claim 7, wherein the displacement mechanism is a strap surrounding the space module and in operative engagement with the stands and a tightener for tightening the strap and forcing the stands toward a vertical orientation and simultaneously securing the stands to the space module.

9. An assembly according to claim 7, wherein the arms are adjustable in length.

10. An assembly according to claim 9, wherein each arm comprises a first tubular member formed with at least one hole, a second tubular member in telescoping engagement with the first tubular member and formed with at least two holes, and a locking pin threaded through aligned holes in the tubular members.

* * * * *